United States Patent
Ogino

[11] 4,198,128
[45] Apr. 15, 1980

[54] WIDE ANGLE ZOOM LENS SYSTEM

[75] Inventor: Shuji Ogino, Osaka, Japan

[73] Assignee: Minolta Camera Kabushiki Kaisha, Osaka, Japan

[21] Appl. No.: 866,939

[22] Filed: Jan. 4, 1978

[30] Foreign Application Priority Data

Jan. 21, 1977 [JP] Japan .................................. 52-6167

[51] Int. Cl.² .............................................. G02B 15/14
[52] U.S. Cl. .................................................. 350/184
[58] Field of Search ................................. 350/184, 186

[56] References Cited
FOREIGN PATENT DOCUMENTS 2557547 7/1976 Fed. Rep. of Germany ........... 350/184

*Primary Examiner*—Conrad J. Clark
*Attorney, Agent, or Firm*—Jackson, Jones & Price

[57] ABSTRACT

A wide angle zoom lens system having a compact configuration is provided for use with 35 mm single lens reflex cameras. The zoom lens system includes two lens groups that can be relatively displaced along the optical axis to provide variation in focal length. The first lens group has a negative refractive power and the second lens group has a positive refractive power. A wide field angle is provided while minimizing the number of optical lens elements that constitute the two group zoom lens system.

11 Claims, 40 Drawing Figures

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

Spherical Aberration
Sine Condition

Astigmatism

Distortion

FIG.14a
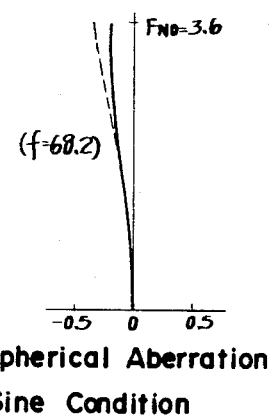
(f=68.2)
F$_{NO}$=3.6
Spherical Aberration
Sine Condition
FIG.14b
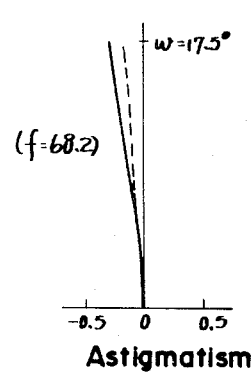
(f=68.2)
ω=17.5°
Astigmatism
FIG.14c
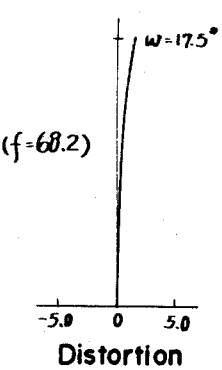
(f=68.2)
ω=17.5°
Distortion
FIG.15a
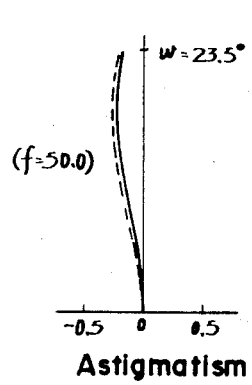
(f=50.0)
F$_{NO}$=3.6
Spherical Aberration
Sine Condition
FIG.15b
(f=50.0)
ω=23.5°
Astigmatism
FIG.15c
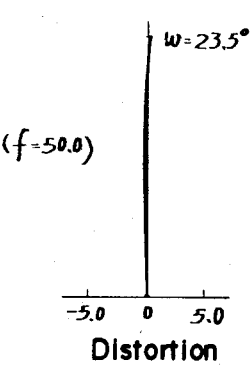
(f=50.0)
ω=23.5°
Distortion
FIG.16a
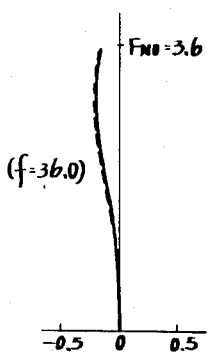
(f=36.0)
F$_{NO}$=3.6
Spherical Aberration
Sine Condition
FIG.16b
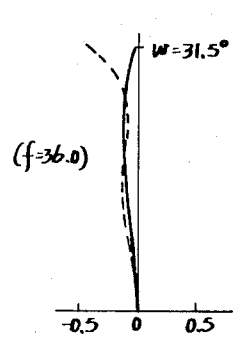
(f=36.0)
ω=31.5°
Astigmatism
FIG.16c
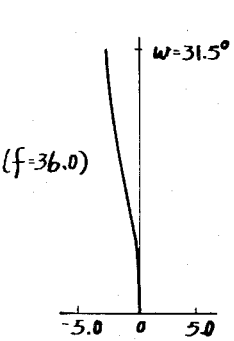
(f=36.0)
ω=31.5°
Distortion

WIDE ANGLE ZOOM LENS SYSTEM

BACKGROUND OF THE INVENTION

1. Field of the Invention

The present invention is directed to a relatively compact wide angle zoom lens system and more particularly to a two group zoom lens system having a negative front group and a positive rear group wherein the zooming mode of operation can be achieved by varying the air space formed between the front and rear lens groups.

2. Brief Description of the Prior Art

Both professional and amateur photographers have been increasingly purchasing zoom lens systems as opposed to single fixed focal length lenses in the range of 28 to 300 mm. Modern zoom lens systems were introduced in the 1950's and have become increasingly popular in the 1970's.

A particular limitation in zoom lens systems is that they are not readily adaptable to a wide angle format particularly when it is desired to maintain a relatively lightweight compact lens system. The use of a two group zoom lens system will generally produce a tendency to create substantial changes in aberrations such as spherical aberration, coma and distortion during the zooming operation. Additionally, the total length of the system tends to be increased since the zoom system is of the retrofocus type.

Various forms of two lens group zoom lens systems have been suggested in the prior art such as disclosed in the German Offenlegungsschrift No. 2,557,547; Japanese Pat. Publication No. 40-8985; and Japanese Patent Applications laid open to public inspection No. 49-2548 and No. 51-83543.

The German Offenlegungsschrift is of some interest in that it discloses a zoom lens system having a positive front component. A two lens group zoom lens system of this type is suitable for a zooming mode of operation in the range of wide angle photography since it provides a power distribution of a retrofocus type. However, the spherical aberration related to the higher order of aberration coefficients tends to be insufficiently corrected when the zoom lens system is set at the longest focal length. Additionally, substantial variations of aberrations such as distortion and coma occur during the variation of the focal length.

Manufacturers are still seeking to provide a relative compact and economical wide angle two lens group zoom lens system with adequate optical correction.

SUMMARY OF THE INVENTION

It is an object of the present invention to provide a two group zoom lens system having a standard zoom range with an extremely wide field angle approaching 72°. This zoom lens system is corrected for aberrations across the entire zooming mode of operation.

It is another object of the present invention to provide a two group zoom lens system of a standard zoom range in a compact size.

It is still another object of the present invention to provide a two group zoom lens system having a minimal number of lens elements. It is a further object of the present invention to provide a two group zoom lens system of relatively economical construction.

The present invention provides a negative front group in the two group zoom lens system that is capable of being constructed of a positive first lens component, a negative second lens component and a positive third lens component wherein each of the lens components comprise a single lens element. A positive second group on the image side of the first lens group is also provided.

The wide angle zoom lens system of the present invention fills the following conditions to provide a compact wide angle zoom lens system;

$$1.1 f_L < L < 2.5 f_L$$

$$0.05 |f_I| < d < 0.4 |f_I|$$

$$0.2 |f_I| < r < 0.6 |f_I|$$

$$0.3 f_{II} < f_{II-1} < f_{II}$$

wherein,
- $f_L$ represents the focal length of the zoom lens system with the system set to the longest focal length of the variable range;
- $L$ represents the total length of the zoom lens system measured from the front surface of the first front lens component to the image plane with the lens system set to the longest focal length of the variable range;
- $d$ represents the axial distance between the rear surface of the second lens component and the front surface of the third lens component;
- $r$ represents the radius of curvature of the rear surface of the second lens component;
- $f_I$ represents the focal length of the first lens group;
- $f_{II}$ represents the focal length of the second lens group; and
- $f_{II-1}$ represents the focal length of the fourth front lens component.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 14a, 14b and 14c are respectively graphical plots of the spherical aberration, astigmatism and distortion for f=68.2 of the fourth embodiment;

FIGS. 15a, 15b and 15c are graphical plots of various aberrations of the fourth embodiment for f=50, and FIGS. 16a, 16b and 16c are respectively graphical plots for various aberrations of the fourth embodiment for f=36.

DESCRIPTION OF THE PREFERRED EMBODIMENTS

The following description is provided to enable any person skilled in the optical and camera field to make and use the invention and sets forth the best modes contemplated by the inventor of carrying out his invention. Various modifications, however, will remain readily apparent to those skilled in the arts since the generic principals of the present invention have been defined herein specifically to provide a relatively economical and easily manufactured wide angled zoom lens system with a minimum number of lens elements.

The derivation of the formulae and the relation of the powers set forth herein can be accomplished with the assistance of a computer. The present invention represents the parameters of a compromised balance of acceptable aberrations which can be relatively easily manufactured to provide a low cost lens system for utilization with a 35 mm SLR camera.

As can be seen in each of the embodiments of the present invention disclosed in FIGS. 1 through 4, a wide angle zoom lens system having a first and second lens group is provided. Each of the two group zoom lens systems that are described herein are capable of varying the focal length of the zoom lens system by means of changing the air space formed between the two lens groups.

Figure 1:
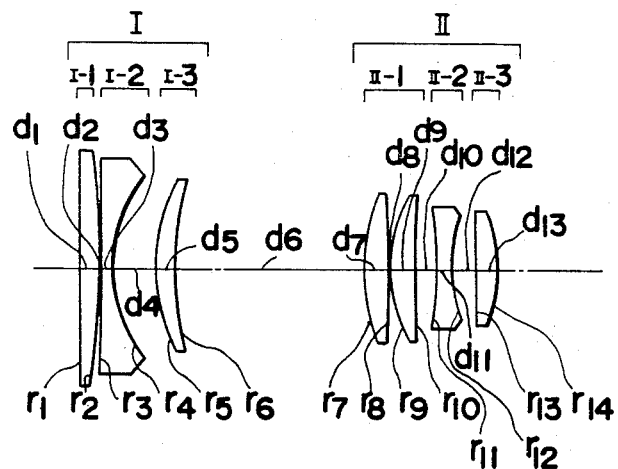
FIG. 1 is a schematic view of the first embodiment of the present invention.
Figure 2:
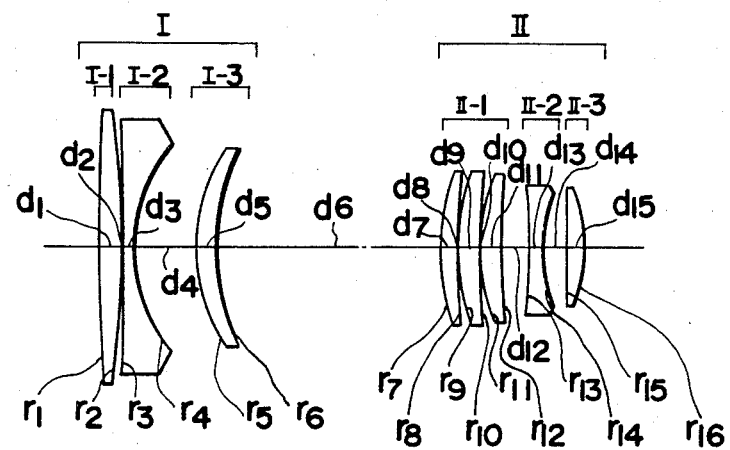
FIG. 2 is a schematic view of a second embodiment of the present invention.
Figure 3:
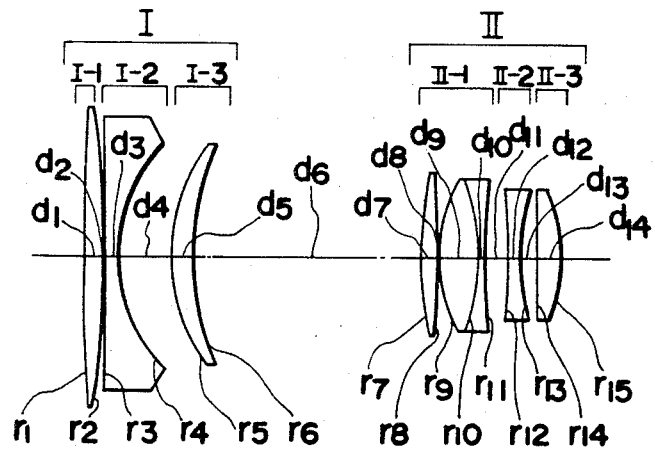
FIG. 3 is a schematic view of a third embodiment of the present invention.
Figure 4:
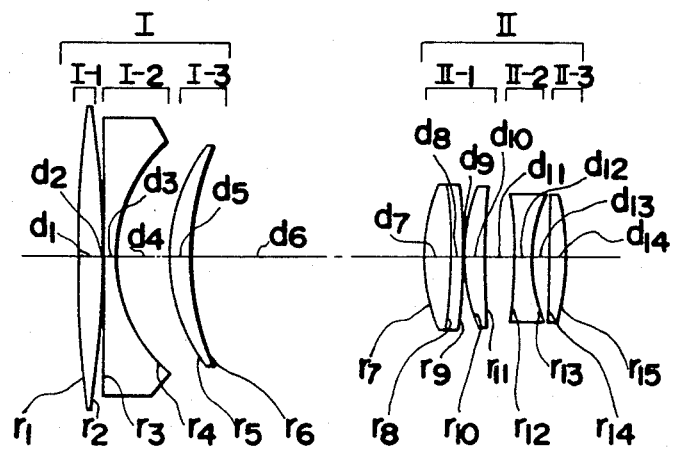
FIG. 4 is a schematic view of a fourth embodiment of the present invention.

Referring specifically to FIG. 1, a first lens group I of a negative refractive power includes a first front lens component I-1 of a positive refractive power and a second intermediate lens component I-2 of a negative refractive power, located at the image side of the first lens component. The specific parameters of each of the lens components can be determined from Table 1 hereinafter. The second intermediate lens component I-2 has a front surface and a rear surface with the absolute value of the radius of curvature of the front surface being greater than that of the rear surface. A rear third lens component I-3 of a positive refractive power is located at the image side of the second intermediate lens component and has a front surface convex to the object side and a rear surface concave to the image side.

A second lens group II of a positive refractive power is located at the image side of the first lens group, and includes a fourth front lens component II-1 of a positive refractive power, a fifth intermediate lens component II-2 of a negative refractive power located at the image side of the fourth lens component and a sixth rear lens component II-3 of a positive refractive power located at the image side of the fifth component. The fifth intermediate lens component has a front surface and a rear surface with the absolute value of the radius of curvature of the front surface being greater than that of the rear surface.

A zoom lens system according to the present invention further has design parameters within the following ranges:

$$1.1 f_L < L < 2.5 f_L \tag{1}$$

$$0.05 |f_I| < d < 0.4 |f_I| \tag{2}$$

$$0.2 |f_I| < r < 0.6 |f_I| \tag{3}$$

$$0.3 f_{II} < f_{II-1} < f_{II} \tag{4}$$

wherein,
$f_L$ represents the focal length of the zoom lens system with the system set to the longest focal length of the variable range;

L represents the total length of the lens system measured from the front surface $r_1$ of the first front lens component I-1 to the image plane with the lens system set to the longest focal length of the variable range;

d represents the axial distance $d_4$ between the rear surface $r_4$ of the second lens component I-2 and the front surface $r_5$ of the third lens component I-3;

r represents the radius of curvature of the rear surface $r_4$ of the second lens component I-2; $f_I$ represents the focal length of the first group I; $f_{II}$ represents the focal length of the second group II; and $f_{II-1}$ represents the focal length of the fourth front lens component II-1.

The above formula (1) defines the available total length of the zoom lens system relative to its maximum optical performance or efficiency. If L becomes smaller than the lower limit of formula (1), then any increased barrel lens compactness is obtained at the sacrifice of a necessarily balanced correction of the aberrations. This is especially true for the higher order spherical aberration coefficients at the longest focal length setting. It may be possible to avoid the above mentioned occurrence of the spherical aberration by means of designing a negative first lens group I to have a weaker refractive power. This design option, however, causes the first lens group I to be shifted across a broader range to obtain the same desired variable range for the focal length. As is readily apparent, a zoom lens system is of no practical commercial use if L is made larger than the upper limit of the formula (1), although the correction of the aberrations may be possible in this case.

Design formula (2) describes a condition for minimizing any changes in various aberrations such as spherical aberration, field curvature, coma and distortion which would accompany the variation of the focal length. Formula (2) also sets forth a limitation in defining the total length of the lens system so that it will be of a practical size.

If d becomes smaller than the lower limit of formula (2), negative distortion increasingly occurs at the shortest focal length setting and the field curvature increases at the medium focal length setting. In contrast thereto, an increase of d beyond the upper limit of formula (2) results in an increased total length of the lens system to such an extent as to lose practical utility.

To solve various optical problems such as the occurrence of higher order spherical aberrations at the longest focal length setting; negative deviation of the image plane at a medium focal plane setting and the occurrence of negative distortion at the shortest focal length setting, formula (3) must be complied with. If r becomes smaller than the lower limit of formula (3), then the spherical aberration is insufficiently corrected at the longest focal length setting or excessively corrected at the shortest focal length setting. Furthermore, the occurrence of negative distortion would be increased at the shortest focal length setting. Conversely, spherical aberration would be excessively corrected at the longest focal length setting or insufficiently corrected at the shortest focal length setting in case r is increased beyond the upper limit of formula (3).

Finally, formula (4) defines a design parameter to avoid an undesirable change in the spherical aberration accompanying any variation of the focal length and further an undesirable occurrence of negative distortion at the shortest focal length setting while still permitting a relatively compact zoom system to be maintained.

If $f_{II-1}$ becomes smaller than the lower limit of formula (4), the correction of spherical aberration will be insufficient at the longest focal length setting and the change in distortion accompanying the variation of the focal length would increase. If $f_{II-1}$ becomes greater than the upper limit of formula (4), then the spherical aberration will be excessively corrected and coma flare will be increased with respect to the off-axial pencil rays.

Figure 5A:
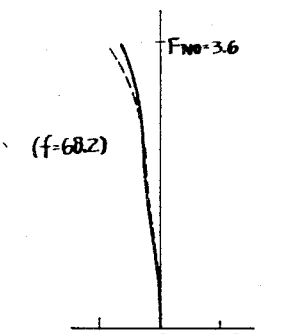
FIGS. 5a, 5b and 5c are respectively graphical plots of the spherical aberration, astigmatism and distortion for f=68.2 of the first embodiment.
Figure 5B:
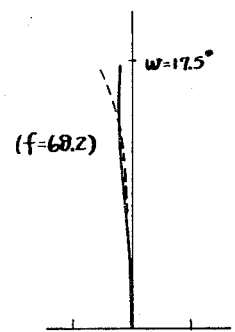
Figure 5C:
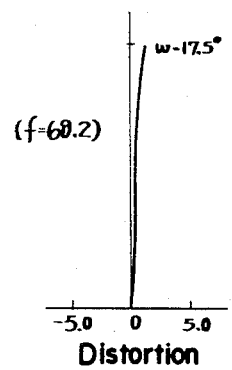
Figure 6A:
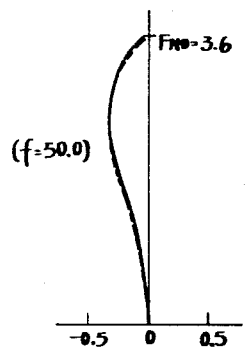
FIGS. 6a, 6b and 6c are graphical plots of various aberrations of the first embodiment for f=50.
Figure 6B:
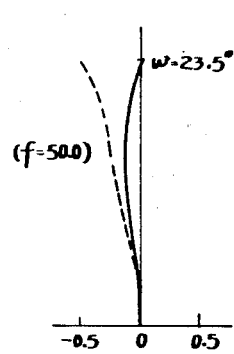
Figure 6C:
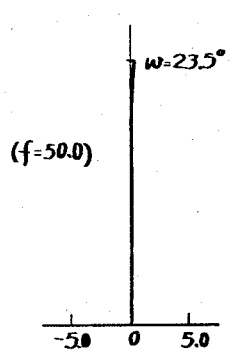
Figure 7A:
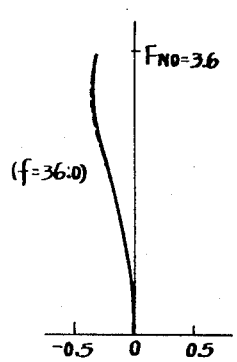
FIGS. 7a, 7b and 7c are graphical plots of the various aberrations of the first embodiment for f=36.
Figure 7B:
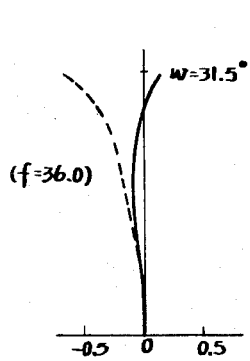
Figure 7C:
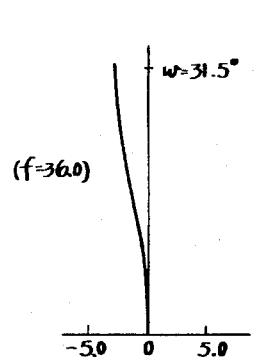
Figure 8A:
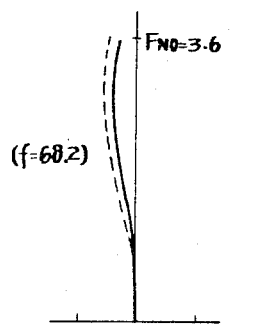
FIGS. 8a, 8b and 8c are respectively graphical plots of the spherical aberration, astigmatism and distortion for f=68.2 of the second embodiment.
Figure 8B:
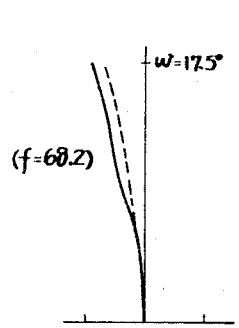
Figure 8C:
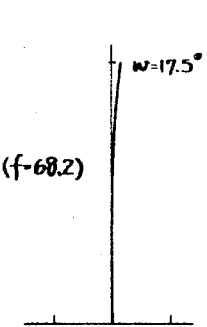
Figure 10A:
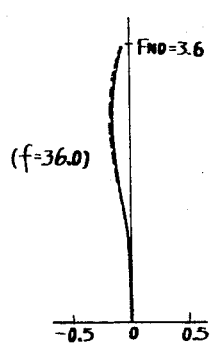
FIGS. 10a, 10b and 10c are graphical plots of various aberrations of the second embodiment for f=36.
Figure 10B:
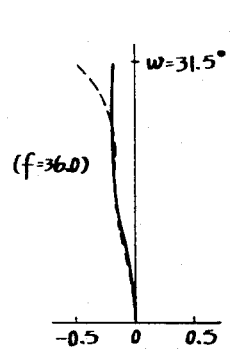
Figure 10C:
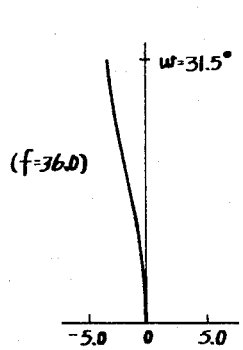
Figure 11A:
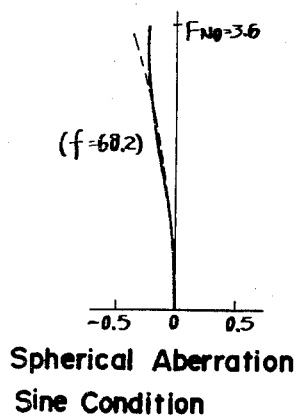
FIGS. 11a, 11b and 11c are respectively graphical plots of the spherical aberration, astigmatism and distortion for f=68.2 for the third embodiment.
Figure 11B:
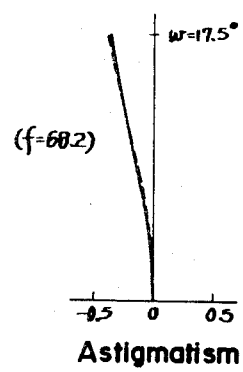
Figure 11C:
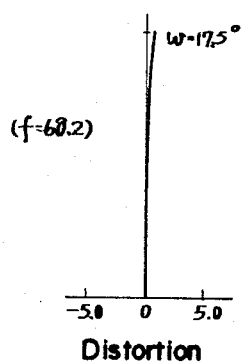
Figure 12A:
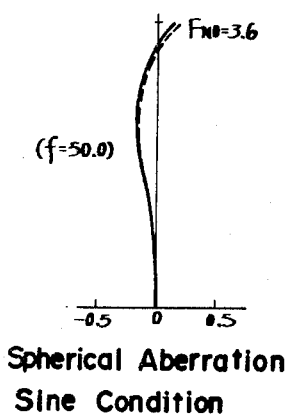
FIGS. 12a, 12b and 12c are graphical plots of various aberrations of the third embodiment for f=50.
Figure 12B:
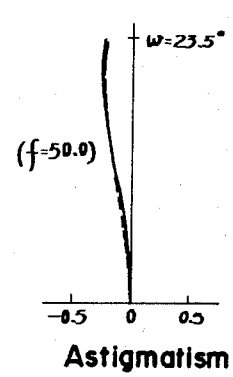
Figure 12C:
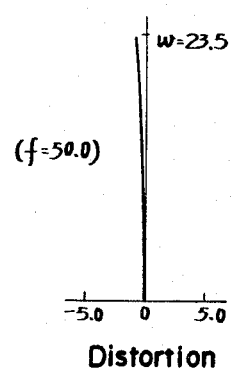
Figure 13A:
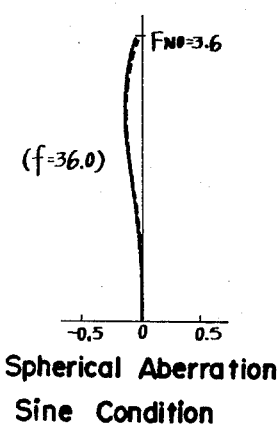
FIGS. 13a, 13b and 13c are respectively graphical plots of various aberrations for the third embodiment for f=36.
Figure 13B:
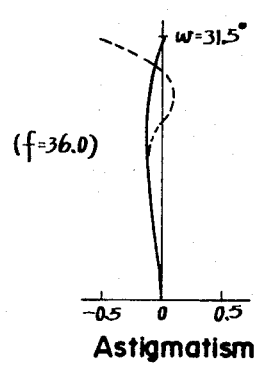
Figure 13C:
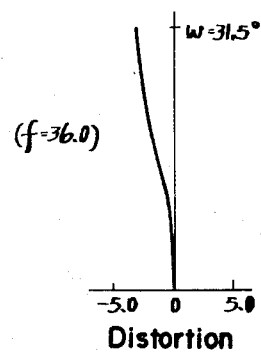

The following Tables 1 to 4 set forth specific dimensional examples of the embodiments 1 to 4 of the present invention, respectively. The aberrations associated with the first embodiment are plotted in FIGS. 5 to 7; second embodiment (FIGS. 8 to 10); third embodiment (FIGS. 11 to 13) and fourth embodiment (FIGS. 14 to 16).

Table 1

(Embodiment 1)
$f = 68.2 \sim 36.0$  $F_{No.} = 3.6$  Field Angle = 35° ~ 63°

| | | Radius of Curvature | Axial Distance | Refractive Index | Abbe Number |
|---|---|---|---|---|---|
| I | $r_1$ | −1813.2 | | | |
| | | | $d_1$ 3.3 | $N_1$ 1.74 | $v_1$ 28.3 |
| | $r_2$ | −148.86 | | | |
| | | | $d_2$ 0.1 | | |
| | $r_3$ | 1368.0 | | | |
| | | | $d_3$ 2.0 | $N_2$ 1.7352 | $v_2$ 40.9 |
| | $r_4$ | 22.76 | | | |
| | | | $d_4$ 7.5 | | |
| | $r_5$ | 27.62 | | | |
| | | | $d_5$ 3.2 | $N_3$ 1.8052 | $v_3$ 25.4 |
| | $r_6$ | 39.89 | | | |
| | | | $d_6$ 0.62 ~ 32.49 | | |
| II | $r_7$ | 39.08 | | | |
| | | | $d_7$ 3.7 | $N_4$ 1.67 | $v_4$ 57.1 |
| | $r_8$ | −303.76 | | | |
| | | | $d_8$ 0.1 | | |
| | $r_9$ | 22.02 | | | |
| | | | $d_9$ 4.5 | $N_5$ 1.6779 | $v_5$ 55.4 |
| | $r_{10}$ | 221.41 | | | |
| | | | $d_{10}$ 4.0 | | |
| | $r_{11}$ | −69.18 | | | |
| | | | $d_{11}$ 2.0 | $N_6$ 1.8052 | $v_6$ 25.4 |
| | $r_{12}$ | 18.82 | | | |
| | | | $d_{12}$ 4.0 | | |
| | $r_{13}$ | −1328.3 | | | |
| | | | $d_{13}$ 3.5 | $N_7$ 1.683 | $v_7$ 31.5 |
| | $r_{14}$ | −27.59 | | | |

$f_I = -62.5$
$f_{II} = 38.87$

Table 2

(Embodiment 2)
$f = 68.2 \sim 36.0$  $F_{No.} = 3.6$  Field Angle = 35° ~ 63°

| | | Radius of Curvature | Axial Distance | Refractive Index | Abbe Number |
|---|---|---|---|---|---|
| I | $r_1$ | 344.26 | | | |
| | | | $d_1$ 3.6 | $N_1$ 1.7495 | $v_1$ 50.1 |
| | $r_2$ | −194.18 | | | |
| | | | $d_2$ 0.1 | | |
| | $r_3$ | −168.89 | | | |
| | | | $d_3$ 2.0 | $N_2$ 1.7495 | $v_2$ 50.1 |
| | $r_4$ | 25.85 | | | |
| | | | $d_4$ 11.04 | | |
| | $r_5$ | 30.41 | | | |
| | | | $d_5$ 3.0 | $N_3$ 1.8052 | $v_3$ 25.4 |
| | $r_6$ | 39.77 | | | |
| | | | $d_6$ 1.60 ~ 38.37 | | |
| II | $r_7$ | 41.70 | | | |
| | | | $d_7$ 2.6 | $N_4$ 1.6214 | $v_4$ 61.3 |
| | $r_8$ | 112.30 | | | |
| | | | $d_8$ 0.1 | | |
| | $r_9$ | 33.86 | | | |
| | | | $d_9$ 3.5 | $N_5$ 1.6214 | $v_5$ 61.3 |
| | $r_{10}$ | 139.33 | | | |
| | | | $d_{10}$ 0.1 | | |
| | $r_{11}$ | 26.46 | | | |
| | | | $d_{11}$ 3.5 | $N_6$ 1.6214 | $v_6$ 61.3 |
| | $r_{12}$ | 84.20 | | | |
| | | | $d_{12}$ 4.63 | | |
| | $r_{13}$ | −141.36 | | | |
| | | | $d_{13}$ 2.20 | $N_7$ 1.8052 | $v_7$ 25.4 |
| | $r_{14}$ | 19.63 | | | |
| | | | $d_{14}$ 4.0 | | |
| | $r_{15}$ | 102.37 | | | |
| | | | $d_{15}$ 3.0 | $N_8$ 1.683 | $v_8$ 31.5 |
| | $r_{16}$ | −38.27 | | | |

$f_I = -66.67$
$f_{II} = 42.06$

Table 3

(Embodiment 3)
$f = 68.2 \sim 36.0$  $F_{No.} = 3.6$  Field Angle = 35° ~ 63°

| | | Radius of Curvature | Axial Distance | Refractive Index | Abbe Number |
|---|---|---|---|---|---|
| I | $r_1$ | 918.0 | | | |
| | | | $d_1$ 3.5 | $N_1$ 1.7495 | $v_1$ 50.1 |
| | $r_2$ | −159.54 | | | |
| | | | $d_2$ 0.1 | | |
| | $r_3$ | −3589.0 | | | |
| | | | $d_3$ 2.0 | $N_2$ 1.757 | $v_2$ 47.7 |
| | $r_4$ | 25.09 | | | |
| | | | $d_4$ 9.26 | | |
| | $r_5$ | 29.92 | | | |
| | | | $d_5$ 3.5 | $N_3$ 1.8082 | $v_3$ 25.4 |
| | $r_6$ | 41.80 | | | |
| | | | $d_6$ 1.9 ~ 38.67 | | |
| II | $r_7$ | 60.73 | | | |
| | | | $d_7$ 3.0 | $N_4$ 1.67 | $v_4$ 57.1 |
| | $r_8$ | −172.17 | | | |
| | | | $d_8$ 0.15 | | |
| | $r_9$ | 23.83 | | | |
| | | | $d_9$ 6.3 | $N_5$ 1.67 | $v_5$ 57.1 |
| | $r_{10}$ | −46.21 | | | |
| | | | $d_{10}$ 1.5 | $N_6$ 1.7495 | $v_6$ 50.1 |
| | $r_{11}$ | 124.38 | | | |
| | | | $d_{11}$ 4.01 | | |
| | $r_{12}$ | −97.16 | | | |
| | | | $d_{12}$ 1.5 | $N_7$ 1.8052 | $v_7$ 25.4 |
| | $r_{13}$ | 22.64 | | | |
| | | | $d_{13}$ 3.5 | | |
| | $r_{14}$ | 261.90 | | | |
| | | | $d_{14}$ 3.5 | $N_8$ 1.7495 | $v_8$ 35.2 |
| | $r_{15}$ | −32.28 | | | |

$f_I = -66.67$
$f_{II} = 42.06$

Table 4

(Embodiment 4)
$f = 68.2 \sim 36.0$  $F_{No.} = 3.6$  Field Angle $= 35° \sim 63°$

| | | Radius of Curvature | Axial Distance | Refractive Index | Abbe Number |
|---|---|---|---|---|---|
| I | $r_1$ | 232.06 | | | |
| | | | $d_1$ 4.0 | $N_1$ 1.5213 | $v_1$ 51.1 |
| | $r_2$ | −158.28 | | | |
| | | | $d_2$ 0.1 | | |
| | $r_3$ | −1654.7 | | | |
| | | | $d_3$ 2.0 | $N_2$ 1.744 | $v_2$ 45.0 |
| | $r_4$ | 25.76 | | | |
| | | | $d_4$ 9.0 | | |
| | $r_5$ | 30.78 | | | |
| | | | $d_5$ 3.5 | $N_3$ 1.8052 | $v_3$ 25.4 |
| | $r_6$ | 43.50 | | | |
| | | | $d_6$ 0.86 ~ 40.18 | | |
| | $r_7$ | 38.00 | | | |
| | | | $d_7$ 4.7 | $N_4$ 1.6214 | $v_4$ 61.3 |
| | $r_8$ | −76.43 | | | |
| | | | $d_8$ 1.5 | $N_5$ 1.74 | $v_5$ 28.3 |
| | $r_9$ | −226.23 | | | |
| | | | $d_9$ 0.1 | | |
| | $r_{10}$ | 25.64 | | | |
| | | | $d_{10}$ 3.3 | $N_6$ 1.72 | $v_6$ 50.2 |
| II | $r_{11}$ | 79.92 | | | |
| | | | $d_{11}$ 5.63 | | |
| | $r_{12}$ | −79.17 | | | |
| | | | $d_{12}$ 2.57 | $N_7$ 1.7006 | $v_7$ 30.1 |
| | $r_{13}$ | 20.89 | | | |
| | | | $d_{13}$ 3.0 | | |
| | $r_{14}$ | 217.61 | | | |
| | | | $d_{14}$ 3.5 | $N_8$ 1.744 | $v_8$ 45.0 |
| | $r_{15}$ | −36.24 | | | |

$f_I = -71.43$
$f_{II} = 41.97$

What is claimed is:

1. A wide angle, compact two-group zoom lens system capable of varying the focal length of the system by means of changing the air space formed between the two groups, comprising:
    a first group of a negative refractive power including a first front lens component of a positive refractive power, a second intermediate lens component of a negative refractive power located at the image side of the first lens component, the second intermediate lens component having a front surface and a rear surface and the absolute value of the radius of curvature of the front surface being greater than that of the rear surface, and a rear third lens component of a positive refractive power located at the image side of the second lens component, the third rear lens component having a front surface convex to the object side and a rear surface concave to the image side; and
    a second group of a positive refractive power located at the image side of the first group, including a fourth front lens component of a positive refractive power, a fifth intermediate lens component of a negative refractive power located at the image side of the fourth lens component, the fifth intermediate lens component having a front surface and a rear surface and the absolute value of the radius of curvature of the front surface being greater than that of the rear surface, and a sixth rear lens component of a positive refractive power located at the image side of the fifth component, wherein each of the first, second and third lens components consists of a single lens element.

2. The invention of claim 1, wherein the fourth lens component consists of only a pair of single lens elements, the fifth lens component consists of a single lens element and the sixth lens component has at least one lens element.

3. The invention of claim 1, wherein the fourth lens component consists of three single lens elements, the fifth lens component consists of a single lens element and the sixth lens component has at least one lens element.

4. The invention of claim 1, wherein the fourth lens component consists of a cemented doublet lens element and a single lens element, the fifth lens component consists of a single lens element and the sixth lens component has at least one lens element.

5. The invention of claim 4, wherein the single lens element is located at the front of the fourth lens component.

6. The invention of claim 4, wherein the cemented doublet lens element is located at the front of the fourth lens component.

7. The invention of claim 1, wherein the fourth lens component consists of plurality of lens elements, the fifth lens component consists of a single lens element and the sixth lens component has at least one lens element.

8. A wide angle zoom lens system capable of providing a variable focal length comprising the following design parameters;

$f = 68.2 \sim 36.0$  $F_{No.} = 3.6$  Field Angle $= 35° \sim 63°$

| | | Radius of Curvature | Axial Distance | Refractive Index | Abbe Number |
|---|---|---|---|---|---|
| I | $r_1$ | −1813.2 | | | |
| | | | $d_1$ 3.3 | $N_1$ 1.74 | $v_1$ 28.3 |
| | $r_2$ | −148.86 | | | |
| | | | $d_2$ 0.1 | | |
| | $r_3$ | 1368.0 | | | |
| | | | $d_3$ 2.0 | $N_2$ 1.7352 | $v_2$ 40.9 |
| | $r_4$ | 22.76 | | | |
| | | | $d_4$ 7.5 | | |
| | $r_5$ | 27.62 | | | |
| | | | $d_5$ 3.2 | $N_3$ 1.8052 | $v_3$ 25.4 |
| | $r_6$ | 39.89 | | | |
| | | | $d_6$ 0.62 ~ 32.49 | | |
| II | $r_7$ | 39.08 | | | |
| | | | $d_7$ 3.7 | $N_4$ 1.67 | $v_4$ 57.1 |
| | $r_8$ | −303.76 | | | |
| | | | $d_8$ 0.1 | | |
| | $r_9$ | 22.02 | | | |
| | | | $d_9$ 4.5 | $N_5$ 1.6779 | $v_5$ 55.4 |
| | $r_{10}$ | 221.41 | | | |
| | | | $d_{10}$ 4.0 | | |
| | $r_{11}$ | −69.18 | | | |
| | | | $d_{11}$ 2.0 | $N_6$ 1.8052 | $v_6$ 25.4 |
| | $r_{12}$ | 18.82 | | | |
| | | | $d_{12}$ 4.0 | | |
| | $r_{13}$ | −1328.3 | | | |
| | | | $d_{13}$ 3.5 | $N_7$ 1.683 | $v_7$ 31.5 |
| | $r_{14}$ | −27.59 | | | |

$f_I = -62.5$
$f_{II} = 38.87$ wherein $f_I$ represents the focal length of the lens surfaces $r_1$ to $r_6$ and $f_{II}$ represents the focal length of the lens surfaces $r_7$ to $r_{14}$.

9. A wide angle zoom lens system capable of providing a variable focal length comprising the following design parameters;

| $f = 68.2 \sim 36.0$ $F_{No.} = 3.6$ Field Angle = 35° ~ 63° | | | | | |
|---|---|---|---|---|---|
| | Radius of Curvature | Axial Distance | | Refractive Index | Abbe Number |
| I $r_1$ | 344.26 | | | | |
| | | $d_1$ 3.6 | $N_1$ | 1.7495 $\nu_1$ | 50.1 |
| $r_2$ | −194.18 | | | | |
| | | $d_2$ 0.1 | | | |
| $r_3$ | −168.89 | | | | |
| | | $d_3$ 2.0 | $N_2$ | 1.7495 $\nu_2$ | 50.1 |
| $r_4$ | 25.85 | | | | |
| | | $d_4$ 11.04 | | | |
| $r_5$ | 30.41 | | | | |
| | | $d_5$ 3.0 | $N_3$ | 1.8052 $\nu_3$ | 25.4 |
| $r_6$ | 39.77 | | | | |
| | | $d_6$ 1.60 ~ 38.37 | | | |
| $r_7$ | 41.70 | | | | |
| | | $d_7$ 2.6 | $N_4$ | 1.6214 $\nu_4$ | 61.3 |
| II $r_8$ | 112.30 | | | | |
| | | $d_8$ 0.1 | | | |
| $r_9$ | 33.86 | | | | |
| | | $d_9$ 3.5 | $N_5$ | 1.6214 $\nu_5$ | 61.3 |
| $r_{10}$ | 139.33 | | | | |
| | | $d_{10}$ 0.1 | | | |
| $r_{11}$ | 26.46 | | | | |
| | | $d_{11}$ 3.5 | $N_6$ | 1.6214 $\nu_6$ | 61.3 |
| $r_{12}$ | 84.20 | | | | |
| | | $d_{12}$ 4.63 | | | |
| $r_{13}$ | −141.36 | | | | |
| | | $d_{13}$ 2.20 | $N_7$ | 1.8052 $\nu_7$ | 25.4 |
| $r_{14}$ | 19.63 | | | | |
| | | $d_{14}$ 4.0 | | | |
| $r_{15}$ | 102.37 | | | | |
| | | $d_{15}$ 3.0 | $N_8$ | 1.683 $\nu_8$ | 31.5 |
| $r_{16}$ | −38.27 | | | | |
| | $f_I = -66.67$ | | | | |
| | $f_{II} = 42.06$ | | | | | wherein $f_I$ represents the focal length of the lens surfaces $r_1$ to $r_6$ and $f_{II}$ represents the focal length of the lens surfaces $r_7$ to $r_{14}$.

10. A wide angle zoom lens system capable of providing a variable focal length comprising the following design parameters;

| $f = 68.2 \sim 36.0$ $F_{No.} = 3.6$ Field Angle = 35° ~ 63° | | | | | |
|---|---|---|---|---|---|
| | Radius of Curvature | Axial Distance | | Refractive Index | Abbe Number |
| I $r_1$ | 918.0 | | | | |
| | | $d_1$ 3.5 | $N_1$ | 1.7495 $\nu_1$ | 50.1 |
| $r_2$ | −159.54 | | | | |
| | | $d_2$ 0.1 | | | |
| $r_3$ | −3589.0 | | | | |
| | | $d_3$ 2.0 | $N_2$ | 1.757 $\nu_2$ | 47.7 |
| $r_4$ | 25.09 | | | | |
| | | $d_4$ 9.26 | | | |
| $r_5$ | 29.92 | | | | |
| | | $d_5$ 3.5 | $N_3$ | 1.8082 $\nu_3$ | 25.4 |
| $r_6$ | 41.80 | | | | |
| | | $d_6$ 1.9 ~ 38.67 | | | |
| $r_7$ | 60.73 | | | | |

-continued

| $f = 68.2 \sim 36.0$ $F_{No.} = 3.6$ Field Angle = 35° ~ 63° | | | | | |
|---|---|---|---|---|---|
| | Radius of Curvature | Axial Distance | | Refractive Index | Abbe Number |
| | | $d_7$ 3.0 | $N_4$ | 1.67 $\nu_4$ | 57.1 |
| $r_8$ | −172.17 | | | | |
| | | $d_8$ 0.15 | | | |
| $r_9$ | 23.83 | | | | |
| | | $d_9$ 6.3 | $N_5$ | 1.67 $\nu_5$ | 57.1 |
| II $r_{10}$ | −46.21 | | | | |
| | | $d_{10}$ 1.5 | $N_6$ | 1.7495 $\nu_6$ | 50.1 |
| $r_{11}$ | 124.38 | | | | |
| | | $d_{11}$ 4.01 | | | |
| $r_{12}$ | −97.16 | | | | |
| | | $d_{12}$ 1.5 | $N_7$ | 1.8052 $\nu_7$ | 25.4 |
| $r_{13}$ | 22.64 | | | | |
| | | $d_{13}$ 3.5 | | | |
| $r_{14}$ | 261.90 | | | | |
| | | $d_{14}$ 3.5 | $N_8$ | 1.7495 $\nu_8$ | 35.2 |
| $r_{15}$ | −32.28 | | | | |
| | $f_I = -66.67$ | | | | |
| | $f_{II} = 42.06$ | | | | | wherein $f_I$ represents the focal length of the lens surfaces $r_1$ to $r_6$ and $f_{II}$ represents the focal length of the lens surfaces $r_7$ to $r_{14}$.

11. A wide angle zoom lens system capable of providing a variable focal length comprising the following design parameters;

| $f = 68.2 \sim 36.0$ $F_{No.} = 3.6$ Field Angle = 35° ~ 63° | | | | | |
|---|---|---|---|---|---|
| | Radius of Curvature | Axial Distance | | Refractive Index | Abbe Number |
| I $r_1$ | 232.06 | | | | |
| | | $d_1$ 4.0 | $N_1$ | 1.5213 $\nu_1$ | 51.1 |
| $r_2$ | −158.28 | | | | |
| | | $d_2$ 0.1 | | | |
| $r_3$ | −1654.7 | | | | |
| | | $d_3$ 2.0 | $N_2$ | 1.744 $\nu_2$ | 45.0 |
| $r_4$ | 25.76 | | | | |
| | | $d_4$ 9.0 | | | |
| $r_5$ | 30.78 | | | | |
| | | $d_5$ 3.5 | $N_3$ | 1.8052 $\nu_3$ | 25.4 |
| $r_6$ | 43.50 | | | | |
| | | $d_6$ 0.86 ~ 40.18 | | | |
| $r_7$ | 38.00 | | | | |
| | | $d_7$ 4.7 | $N_4$ | 1.6214 $\nu_4$ | 61.3 |
| $r_8$ | −76.43 | | | | |
| | | $d_8$ 1.5 | $N_5$ | 1.74 $\nu_5$ | 28.3 |
| $r_9$ | −226.23 | | | | |
| | | $d_9$ 0.1 | | | |
| II $r_{10}$ | 25.64 | | | | |
| | | $d_{10}$ 3.3 | $N_6$ | 1.72 $\nu_6$ | 50.2 |
| $r_{11}$ | 79.92 | | | | |
| | | $d_{11}$ 5.63 | | | |
| $r_{12}$ | −79.17 | | | | |
| | | $d_{12}$ 2.57 | $N_7$ | 1.7006 $\nu_7$ | 30.1 |
| $r_{13}$ | 20.89 | | | | |
| | | $d_{13}$ 3.0 | | | |
| $r_{14}$ | 217.61 | | | | |
| | | $d_{14}$ 3.5 | $N_8$ | 1.744 $\nu_8$ | 45.0 |
| $r_{15}$ | −36.24 | | | | |
| | $f_I = -71.43$ | | | | |
| | $f_{II} = 41.97$ | | | | | wherein $f_I$ represents the focal length of the lens surfaces $r_1$ to $r_6$ and $f_{II}$ represents the focal length of the lens surfaces $r_7$ to $r_{14}$.

* * * * *

UNITED STATES PATENT AND TRADEMARK OFFICE
CERTIFICATE OF CORRECTION

PATENT NO. : 4,198,128
DATED : April 15, 1980
INVENTOR(S) : SHUJI OGINO

Figure 9A:
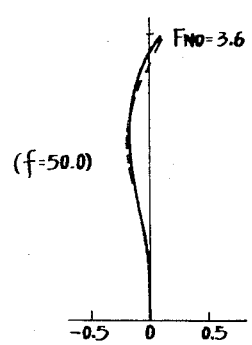
FIGS. 9a, 9b and 9c are graphical plots of various aberrations of the second embodiment for f=50.
Figure 9B:
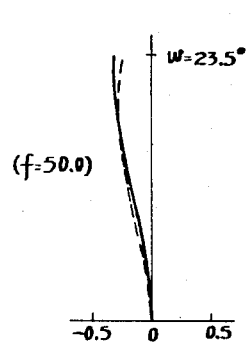
Figure 9C:
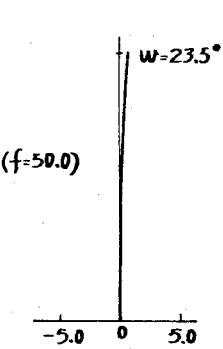

It is certified that error appears in the above—identified patent and that said Letters Patent is hereby corrected as shown below:

Column 2, line 64, after "embodiment;" the words FIGS. 9a, 9b and" should commence a new paragraph;

Column 7, Table 4, line 16, below "$r_6$" and above "$r_7$", delete solid line between ending bracket and beginning bracket;

Column 9, Claim 9, in Table, left brackets should extend from "$r_1$" through "$r_7$";

Column 9, Claim 10, in Table, left brackets should extend from "$r_1$" through "$r_7$";

Column 9, line 40, delete "$r_{II}$" and insert --$f_{II}$--;

Signed and Sealed this

Sixteenth Day of December 1980

[SEAL]

Attest:

SIDNEY A. DIAMOND

Attesting Officer

Commissioner of Patents and Trademarks